(12) United States Patent
Yin et al.

(10) Patent No.: US 12,342,287 B2
(45) Date of Patent: Jun. 24, 2025

(54) POWER CONTROL METHOD AND APPARATUS, AND SERVICE NODE, TERMINAL AND STORAGE MEDIUM

(71) Applicant: ZTE CORPORATION, Shenzhen (CN)

(72) Inventors: Yachao Yin, Shenzhen (CN); Nan Zhang, Shenzhen (CN); Fangyu Cui, Shenzhen (CN); Linxi Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 414 days.

(21) Appl. No.: 17/998,278

(22) PCT Filed: May 13, 2021

(86) PCT No.: PCT/CN2021/093503
§ 371 (c)(1),
(2) Date: Nov. 9, 2022

(87) PCT Pub. No.: WO2021/228175
PCT Pub. Date: Nov. 18, 2021

(65) Prior Publication Data
US 2023/0239803 A1    Jul. 27, 2023

(30) Foreign Application Priority Data
May 14, 2020 (CN) .......................... 202010407761.4

(51) Int. Cl.
*H04W 52/14*    (2009.01)
*H04W 52/46*    (2009.01)

(52) U.S. Cl.
CPC ......... *H04W 52/146* (2013.01); *H04W 52/46* (2013.01)

(58) Field of Classification Search
CPC ... H04W 52/146; H04W 52/46; H04W 52/34; H04W 52/386; H04W 52/248
See application file for complete search history.

(56) References Cited

U.S. PATENT DOCUMENTS

| | | | |
|---|---|---|---|
| 2014/0226551 | A1 | 8/2014 | Ouchi et al. |
| 2015/0358920 | A1 | 12/2015 | Sorrentino et al. |

(Continued)

FOREIGN PATENT DOCUMENTS

| | | | |
|---|---|---|---|
| CN | 108924920 A | 11/2018 | |
| CN | 110049539 A | 7/2019 | |

(Continued)

OTHER PUBLICATIONS

The State Intellectual Property Office of People's Republic of China. First Office Action and Search Report for CN Application No. 202010407761.4 and English translation, mailed Sep. 24, 2024, pp. 1-34.
3GPP Technical Specification Group Radio Access Network. "Medium Access Control (MAC) protocol specification (Release 16)," 3GPP TS 38.321, Version 16.0.0, 2020, pp. 1-141.
3GPP Technical Specification Group Radio Access Network. "Physical layer control procedure in NR-NTN" R1-1909982, 3GPP TSG RAN WG1 Meeting #98bis, Oct. 2019, pp. 1-4.

(Continued)

*Primary Examiner* — John J Lee
(74) *Attorney, Agent, or Firm* — Vivacqua Crane, PLLC

(57) ABSTRACT

A power control method and apparatus, and a service node, a terminal device and a storage medium are disclosed. The method may include: transmitting configuration information, which is used for indicating N power parameter sets, where N is a positive integer; and receiving uplink data, where the transmission power of the uplink data is determined by a terminal device according to the configuration information.

20 Claims, 5 Drawing Sheets

Receive configuration information, which is used to indicate N power parameter sets, where N is a positive integer — 210

Determine a transmit power according to the configuration information, and transmit uplink data with the transmit power — 220

(56) References Cited

U.S. PATENT DOCUMENTS

| | | | | |
|---|---|---|---|---|
| 2018/0048360 | A1* | 2/2018 | Athley | H04W 48/18 |
| 2020/0404593 | A1* | 12/2020 | Yao | H04L 25/0226 |
| 2022/0311574 | A1* | 9/2022 | Gao | H04L 5/0051 |
| 2022/0361114 | A1 | 11/2022 | Zhao et al. | |

FOREIGN PATENT DOCUMENTS

| | | | |
|---|---|---|---|
| CN | 110167122 A | 8/2019 | |
| CN | 110535605 A | 12/2019 | |
| CN | 110536396 A | 12/2019 | |
| CN | 110831135 A | 2/2020 | |
| CN | 111901859 A | 11/2020 | |
| EP | 3576311 A1 | 12/2019 | |
| EP | 3713312 A1 | 9/2020 | |
| WO | 2018202220 A1 | 11/2018 | |
| WO | 2019096317 A1 | 5/2019 | |

OTHER PUBLICATIONS

3GPP Technical Specification Group Radio Access Network. "Physical layer control procedures in NTN," R1-1912469, 3GPP TSG RAN WG1 Meeting #99, Nov. 2019, pp. 1-5.

3GPP Technical Specification Group Radio Access Network. "Radio Resource Control (RRC) protocol specification(Release 16)," 3GPP TS 38.331, Version 16.0.0, 2020, pp. 1-835.

European Patent Office. Communication Pursuant to Rules 70(2) and 70a(2) EPC for EP Application No. 21804676.1, mailed May 31, 2024, pp. 1-11.

European Patent Office. Extended European Search Report for EP Application No. 21804676.1, mailed May 13, 2024, pp. 1-11.

Korean Intellectual Property Office. First Office Action for KR Application No. 10-2022-7042593 and English translation, mailed May 20, 2024, pp. 1-12.

International Searching Authority. International Search Report and Written Opinion for PCT Application No. PCT/CN2021/093503 and English translation, mailed Aug. 12, 2021, pp. 1-10.

* cited by examiner

POWER CONTROL METHOD AND APPARATUS, AND SERVICE NODE, TERMINAL AND STORAGE MEDIUM

CROSS-REFERENCE TO RELATED APPLICATION

This application is a national stage filing under 35 U.S.C. § 371 of international application number PCT/CN2021/093503, filed May 13, 2021, which claims priority to Chinese patent application No. 202010407761.4, filed May 14, 2020. The contents of this international application are incorporated herein by reference in their entirety.

TECHNICAL FIELD

The present disclosure relates to radio communication networks, for example, to a power control method and apparatus, a service node, a terminal device and a storage medium.

BACKGROUND

In a Non-Terrestrial Network (NTN) system, beams constantly move or are switched as satellites move, so that link quality for transmission of an uplink signal by a terminal device constantly changes. Further, beams of different types of satellites have different impact on the link quality. However, a transmit power of an uplink signal transmitted by the terminal device cannot be adjusted flexibly. If the transmit power is too high, unnecessary power consumption will be caused; and if it is too low, transmission quality of an uplink signal cannot be guaranteed. Because the transmit power cannot dynamically adapt to moving or switching beams, flexibility of power control is poor, which seriously affects communication quality and reliability.

SUMMARY

The present disclosure provides a power control method and apparatus, a service node, a terminal device and a storage medium, to improve flexibility of power control and improve communication quality.

An embodiment of the present disclosure provides a power control method, which is applied to a service node, the method may include: transmitting configuration information, which is utilized to indicate N power parameter sets, where N is a positive integer; and receiving uplink data, where a transmit power of the uplink data is determined by a terminal device according to the configuration information.

An embodiment of the present disclosure provides a power control method, which is applied to a terminal device, the method may include: receiving configuration information, which is utilized to indicate N power parameter sets, where N is a positive integer; and determining a transmit power according to the configuration information, and transmitting uplink data with the transmit power.

An embodiment of the present disclosure provides a power control apparatus, which may include: a power indication module configured to transmit configuration information, which is utilized to indicate N power parameter sets, where N is a positive integer; and a data receiving module configured to receive uplink data, where a transmit power of the uplink data is determined by a terminal device according to the configuration information.

An embodiment of the present disclosure provides a power control apparatus, which may include: an information receiving module configured to receive configuration information, which is utilized to indicate N power parameter sets, where N is a positive integer; and a power control module configured to determine a transmit power according to the configuration information, and transmit uplink data with the transmit power.

An embodiment of the present disclosure provides a service node, which may include: at least one processor; and a storage apparatus, configured to store at least one program, where the at least one program, when executed by the at least one processor, causes the at least one processor to perform the above power control method applied to a service node.

An embodiment of the present disclosure provides a communication node, which may include: at least one processor; and a storage apparatus, configured to store at least one program, where the at least one program, when executed by the at least one processor, causes the at least one processor to perform the above power control method applied to a terminal device.

An embodiment of the present disclosure provides a computer-readable storage medium storing a computer program, where the computer program, when executed by a processor, causes the processor to perform the above power control method applied to a service node or the above power control method applied to a terminal device.

DETAILED DESCRIPTION

The present disclosure will be described hereinafter with reference to the drawings and embodiments.

In an NTN system, a satellite moves, and a coverage area of a beam or cell moves with the movement of the satellite. Beams constantly move or are switched, so that link quality for transmission of an uplink signal by a terminal device constantly changes. Further, beams of different types of satellites have different impact on the link quality. Because a transmit power of the terminal device cannot dynamically adapt to a moving or switching beam, flexibility of power control is poor, which seriously affects communication quality and reliability. According to a case of beam movement and switching in NTN, a service node pre-configures and indicates a power parameter set to the terminal device, thereby realizing flexible indication and control of the transmit power of the terminal device.

Figure 1:
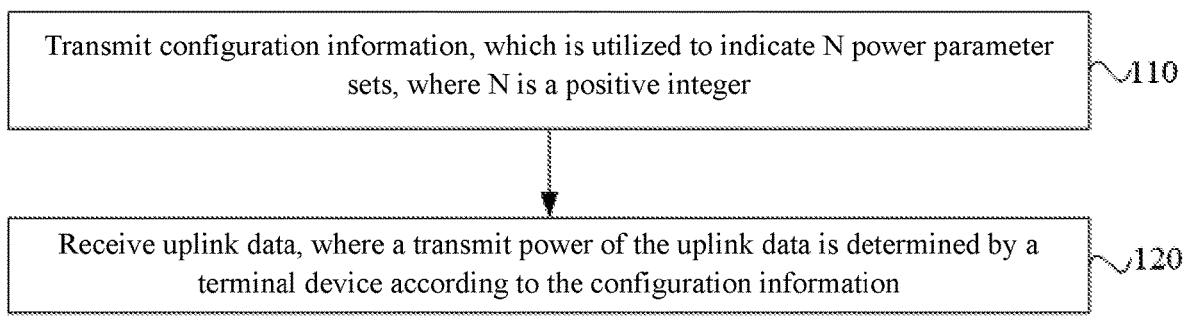
FIG. 1 is a flowchart of a power control method provided by an embodiment.

FIG. 1 is a flowchart of a power control method provided by an embodiment. The power control method, in an implementation, is applied to a service node, for example, a base station. As shown in FIG. 1, the method provided in this embodiment includes steps 110 and 120.

At step 110, configuration information is transmitted, which is utilized to indicate N power parameter sets, where N is a positive integer.

At step 120, uplink data is received, where a transmit power of the uplink data is determined by a terminal device according to the configuration information.

In this embodiment, the service node pre-configures the N power parameter sets and indicates the sets to the terminal device through the configuration information. The N power parameter sets are selected and utilized by the terminal device in cases of different reference signals or carrier-associated beams, being the basis for calculating the transmit power of the uplink data. In a process of indicating the N power parameter sets, correspondences between the N power parameter sets and different beams, different reference signals or different carriers can be indicated, for example, a first power parameter set corresponds to a first beam and a second power parameter set corresponds to a second beam. In response to the terminal device transmitting uplink data utilizing the first beam (utilizing the first beam as a serving beam), a corresponding transmit power on the first beam can be calculated based on the first power parameter set; and in response to the terminal device transmitting uplink data utilizing the second beam (utilizing the second beam as a serving beam), a corresponding transmit power on the second beam can be calculated based on the second power parameter set. In addition, if a serving beam switch occurs, for example, the serving beam is switched from the first beam to the second beam, the terminal device can change the utilized power parameter set according to an indication of the configuration information, to accurately calculate the transmit power and adapt to beam movement or switching.

The service node indicates the pre-configured power parameter set to the terminal device through the configuration information, providing a basis for the terminal device to calculate the transmit power. In this way, the service node realizes flexible indication and control of the transmit power of the terminal device, and improves reliability of power control.

In an embodiment, the N power parameter sets are associated with L beams, where L is a positive integer.

In this embodiment, there are correlations between the N power parameter sets and the L beams. A beam, in the L beams, utilized to transmit the uplink data is the serving beam. The terminal device can select a corresponding power parameter set according to the serving beam, and calculate the transmit power of the uplink data accordingly. The N power parameter sets and the L beams correspond to each other in a certain order, or may have other correlations, which are indicated to the terminal device by the service node.

In an embodiment, each beam is represented by one of: one reference signal; one carrier; or one spatial domain transmission resource; where the spatial domain transmission resource includes one of: an antenna port; a codebook; or a transport layer.

In this embodiment, the service node generates different reference signals or different carriers. The generated carriers includes an anchor carrier and a non-anchor carrier. The anchor carrier is utilized to transmit a narrowband primary synchronization signal, a narrowband secondary synchronization signal, a narrowband physical broadcast channel, a narrowband system information block, or the like. Different beams can be distinguished by correlated different reference signals or different carriers. For example, the service node indicates index values of different reference signals or different carriers to the terminal device to distinguish between different beams, thereby accurately indicating power parameter sets of different beams. Alternatively, different beams can be distinguished by different spatial domain transmission resources. For example, different beams correspond to different antenna ports, different codebooks or different transport layers.

In an embodiment, the configuration information is transmitted through one of the following signaling: a broadcast message; Radio Resource Control (RRC) signaling; Medium Access Control Control Element (MAC CE) signaling; or Downlink Control Information (DCI). The configuration information is transmitted through the foregoing signaling, so that the N power parameter sets can be efficiently indicated.

In an embodiment, the power parameter set includes at least one of: a power nominal value; a partial power compensation factor; a downlink reference signal for path loss measurement; a downlink reference signal transmit power; or a power offset.

In this embodiment, each power parameter set includes at least one of: a power nominal value (PO_PUSCH); a partial power compensation factor ($\alpha$); a downlink reference signal transmit power (rs-power); a power offset of a carrier (rs-PowerOffsetNonAnchor); or a downlink reference signal for path loss measurement. The terminal device can alternatively obtain these power parameters in other manners, for example, the power parameters are predefined in a protocol and therefore directly obtained, or the power parameters are implicitly obtained according to a mapping relationship between other information indicated by the service node and the power parameter set. The terminal device can, based on the power nominal value according to these power parameters, compensate the power and adjust an offset, and calculate the corresponding transmit power under the serving beam in real time. It can be understood by those of ordinary skill in the art that the PO_PUSCH may include a common power level PO_NOMINAL_PUSCH for all UEs in a cell and a UE-specific offset PO_UE_PUSCH for a UE in the cell, that is, the PO_PUSCH may be equal to the sum of a PO_NOMINAL_PUSCH and a PO_UE_PUSCH.

Here, downlink reference signals for path loss measurement under different beams is different or the same, but corresponding transmit powers or fixed power offsets are different. By pre-configuring and indicating the downlink reference signal for path loss measurement, the service node can determine which beam to be the serving beam, providing a reliable basis for the terminal device to apply a corresponding power parameter set.

In some embodiments, the service node can indicate an index of a power parameter set to the terminal device through a System Information Block (SIB) or a Physical Broadcast Channel (PBCH), to instruct the terminal device to utilize the power parameter set among the N power parameter sets.

In some embodiments, the service node indicates a carrier index value corresponding to a beam through a bit field in the SIB. Different carriers are associated with different beams. Therefore, the terminal device can determine power offsets of anchor or non-anchor carriers on different beams according to mapping between the carriers (index values) and the beams.

In an embodiment, the method further includes a step 130 or a step 140.

At step 130, power update indication information is transmitted to the terminal device according to serving beam switching information.

At step 140, power update indication information is transmitted to the terminal device according to an uplink measurement result.

In this embodiment, the serving beam is a beam for data transmission between the service node and the terminal device, and serving beam switching means that a serving beam, in the L beams, utilized for data transmission is switched to another serving beam. For example, in response to the serving beam being switched from beam 1 to beam 2, the service node transmits power update indication information to the terminal device, to instruct the terminal device to utilize a power parameter set associated with beam 2 to calculate the transmit power in the case of serving beam switching. Alternatively, in the case of serving beam switching, the service node will perform a measurement for a path loss of an uplink channel for a new serving beam (beam 2), and transmit, according to an uplink measurement result, power update indication information to the terminal device, to instruct the terminal device to adjust, in response to a change in path loss, the utilized power parameter set according to an actual situation. For example, given the partial power compensation factor in the power parameter set $\alpha=0.7$, the service node transmits the power update indication information to the terminal device according to an uplink measurement result of a path loss, and the terminal device can adjust the partial power compensation factor to $\alpha=1$ accordingly.

In an embodiment, the configuration information is also utilized to indicate correlations between the N power parameter sets and the L beams.

In this embodiment, through the configuration information, the service node can also indicate to the terminal device the correlations between the N power parameter sets and the L beams, that is, indicate a correlation between an $i^{th}$ ($1 \leq i \leq N$) power parameter set and a $j^{th}$ ($1 \leq j \leq L$) beam, so that the terminal device can uniquely determine which power parameter sets to be utilized under different serving beams.

In an embodiment, the method further includes a step 101.

At step 101, first group indication information is transmitted, where the first group indication information includes information of group reference points, and each group reference point corresponds to one group.

In this embodiment, terminal devices in a network are divided into at least one group, and then the configuration information is transmitted by group, thereby saving signaling overheads and network resources, and improving efficiency of indicating the power parameter set. The service node transmits the first group indication information to the terminal device, so that the terminal device can determine a group to which the terminal device belongs according to the first group indication information, and determine, according to an indication of the configuration information, which power parameter set should be utilized by the group to which the terminal device belongs.

In this embodiment, the first group indication information includes the information of group reference points, which may be locations or terminal identifiers of the terminal devices that are considered as group reference points. For example, there are a plurality of terminal devices within a network coverage area of the service node, where terminal device A, terminal device B, and terminal device C are utilized as group reference points, and the first group indication information includes locations of terminal device A, terminal device B, and terminal device C. The service node transmits the first group indication information to each target terminal device, so that the target terminal device can determine, according to the first group indication information, that it belongs to a group of terminal device A, a group of terminal device B, or a group of terminal device C. For example, if the target terminal device determines, according to the received first group indication information, that terminal device B is a terminal device in the group reference points that is closest to the target terminal device, the target terminal device determines that it belongs to the group of terminal device B. After receiving the configuration information, the target terminal device can utilize a power parameter set corresponding to the group of terminal device B to calculate the transmit power.

In an embodiment, the method further includes a step 102.

At step 102, second group indication information is transmitted, where the second group indication information includes a region identifier, and each region corresponds to one group.

In this embodiment, terminal devices in a network are divided into at least one group, and then the configuration information is transmitted by group, thereby saving signaling overheads and network resources, and improving efficiency of indicating the power parameter set. The service node transmits the second first group indication information to the terminal device, so that the terminal device can determine a group to which the terminal device belongs according to the second group indication information, and determine, according to an indication of the configuration information, which power parameter set should be utilized by the group to which the terminal device belongs.

In this embodiment, the second group indication information includes the region identifier. For example, the network coverage area of the service node is divided into region A, region B, and region C, and terminal devices in each region are grouped into the same group. The second group indication information includes a region identifier of region A, region B or region C. The service node transmits the second group indication information to each target terminal device, so that the target terminal device can determine, according to the second group indication information, that it belongs to a group of region A, a group of region B, or a group of region C. For example, if the target terminal device determines, according to the received second group indication information, that it is in region B, the target terminal device determines that it belongs to the group of region B. After receiving the configuration information, the target terminal device can utilize a power parameter set corresponding to the group of region B to calculate the transmit power.

In an embodiment, step 120 includes: transmitting, to each respective one of the groups, a respective power parameter set associated with the respective terminal device group.

In this embodiment, the service node transmits configuration information to each group according to the group reference points or regions, to indicate a respective power parameter set associated with each group, without transmitting configuration information to each terminal device in the network coverage area, thereby saving signaling overheads and network resources and improving efficiency of indicating the power parameter set.

Figure 2:
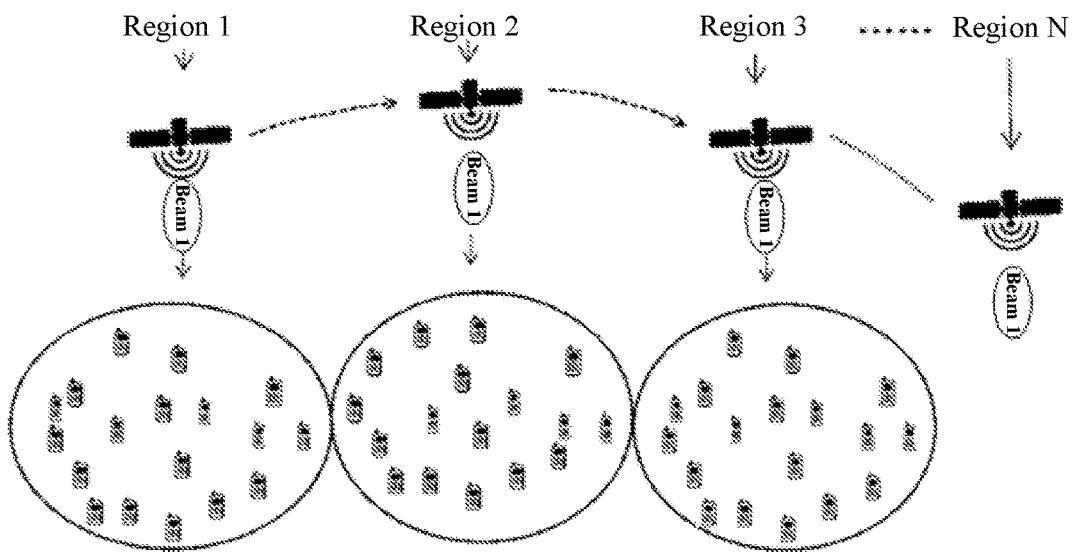
FIG. 2 is a schematic diagram of power control for a single beam of a Low Earth Orbit (LEO) satellite provided by an embodiment.

FIG. 2 is a schematic diagram of power control for a single beam of an LEO satellite provided by an embodiment. As illustratively shown in FIG. 2, a single beam of an LEO satellite moves, and a power control process includes the following steps.

The service node pre-configures power parameter sets corresponding to different power control regions (region 1, region 2, region 3, . . . , region N) in the case of single beam movement, where a path loss in the case of single beam movement has a deviation.

Before the beam moves to a specific region, the service node transmits the configuration information (by group) to the terminal device, where the configuration information may include an index value of a power parameter set and various power parameters therein.

The terminal device receives the configuration information and calculates the transmit power according to the power parameter set indicated by the configuration information. A difference between path losses in different regions can be adjusted by the partial power compensation factor $\alpha$.

Figure 3:
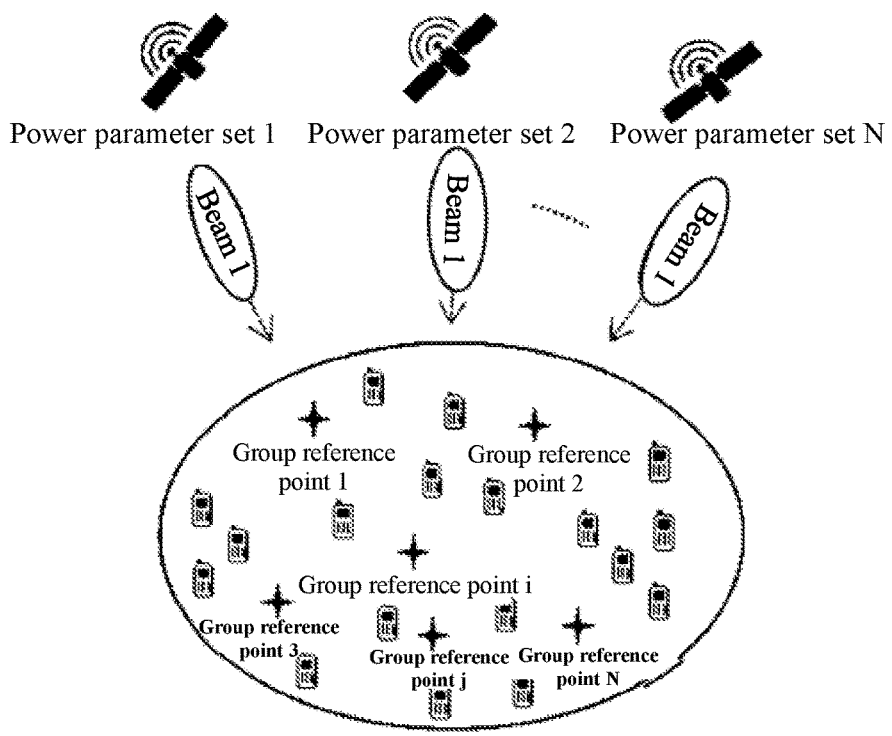
FIG. 3 is a schematic diagram of power control for a fixed beam of an LEO satellite provided by an embodiment.

FIG. 3 is a schematic diagram of power control for a fixed beam of an LEO satellite provided by an embodiment. As illustratively shown in FIG. 3, beams are fixed during LEO satellite movement, and a power control process includes the following steps.

The service node pre-configures power parameter sets of the beam in different directions (power parameter set 1, power parameter set 2, . . . , power parameter set N).

The service node transmits first group indication information according to the satellite ephemeris and moving trajectories of group reference points, to indicate locations of the group reference points to the terminal device.

The terminal device calculates a distance between the terminal device and each of neighboring group reference points, and selects the closest group reference point to determine a group to which the terminal device belongs.

Before the beam changes its orientation, the service node transmits configuration information to each group through SIB or PBCH, where the configuration information may include an index value of a power parameter set to distinguish between beams in different orientations.

The terminal device receives the configuration information and calculates the transmit power according to a corresponding power parameter set utilized by the group to which the terminal device belongs. And a difference between path losses in different directions can be adjusted by the partial power compensation factor $\alpha$.

Figure 4:
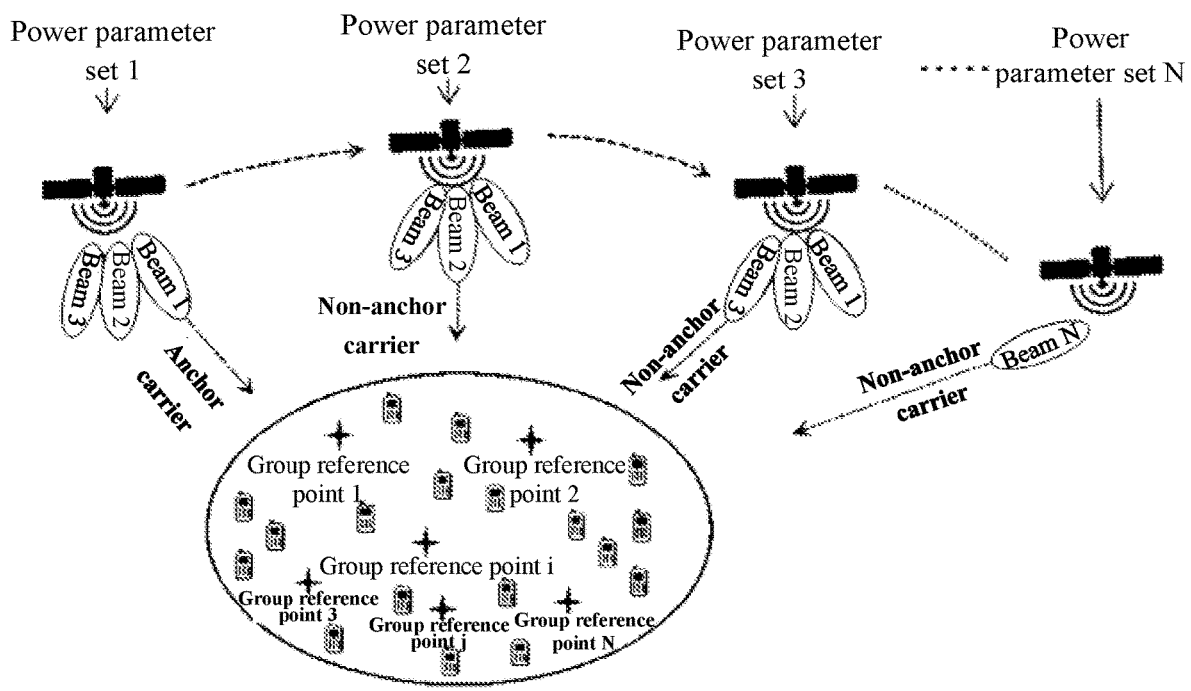
FIG. 4 is a schematic diagram of power control for multi-beam switching of an LEO satellite provided by an embodiment.

FIG. 4 is a schematic diagram of power control for multi-beam switching of an LEO satellite provided by an embodiment. As shown in FIG. 4, using multi-beam switching during LEO satellite movement as an example, a power control process includes the following steps.

The service node pre-configures different power parameter sets (power parameter set 1, power parameter set 2, . . . , power parameter set N), and the different power parameter sets correspond to different beams, which are distinguished by different carriers.

The service node broadcasts index values of different carriers (Anchor or Non-Anchor) to the terminal device through SIB or PBCH to distinguish between different beams.

The service node transmits first group indication information according to the satellite ephemeris and moving trajectories of reference points, to indicate locations of the group reference points to the terminal device.

The terminal device calculates a distance between the terminal device and each of neighboring group reference points, and selects the closest group reference point to determine a group to which the terminal device belongs.

Before serving beam switching, the service node transmits configuration information to each group to indicate a power parameter set including a power nominal value, a partial power compensation factor, a downlink reference signal transmit power, and a downlink reference signal for path loss measurement. The terminal device can obtain a power offset of a carrier (rs-PowerOffsetNonAnchor) by mapping a corresponding index value of the carrier.

The terminal device, according to the group to which the terminal device belongs, receives the configuration information and calculates the transmit power to realize power control of all groups under the serving beam switching.

Figure 5:
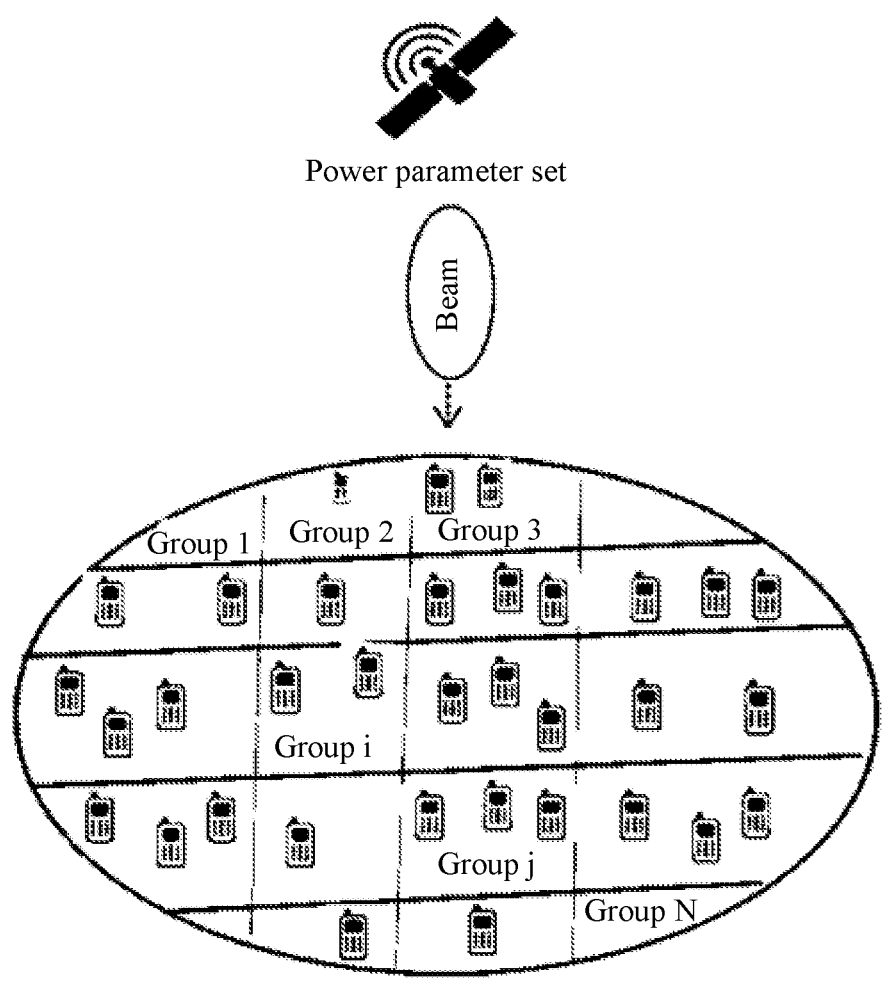
FIG. 5 is a schematic diagram of power control for a single beam of a Geosynchronous Earth Orbit (GEO) satellite provided by an embodiment.

FIG. 5 is a schematic diagram of power control for a single beam of a GEO satellite provided by an embodiment. As shown in FIG. 5, using a single beam during GEO satellite movement as an example, a beam coverage area is always fixed, and a power control process includes the following steps.

The service node divides the beam coverage area into a plurality of regions, and transmits region identifiers to terminal devices in the corresponding regions through the second group indication information.

The service node broadcasts a reference signal, and indicates power parameter sets to the terminal devices through configuration information.

The terminal device receives the configuration information according to the group to which the terminal device belongs, and calculates the transmit power utilizing a power parameter set corresponding to a region to which the terminal device belongs. A difference between transmit powers of different terminal devices can be adjusted by a partial power compensation factor $\alpha$. A power deviation of the terminal device under an anchor carrier or a non-anchor carrier is adjusted by utilizing a power offset of the carrier (rs-PowerOffsetNonAnchor).

Figure 6:
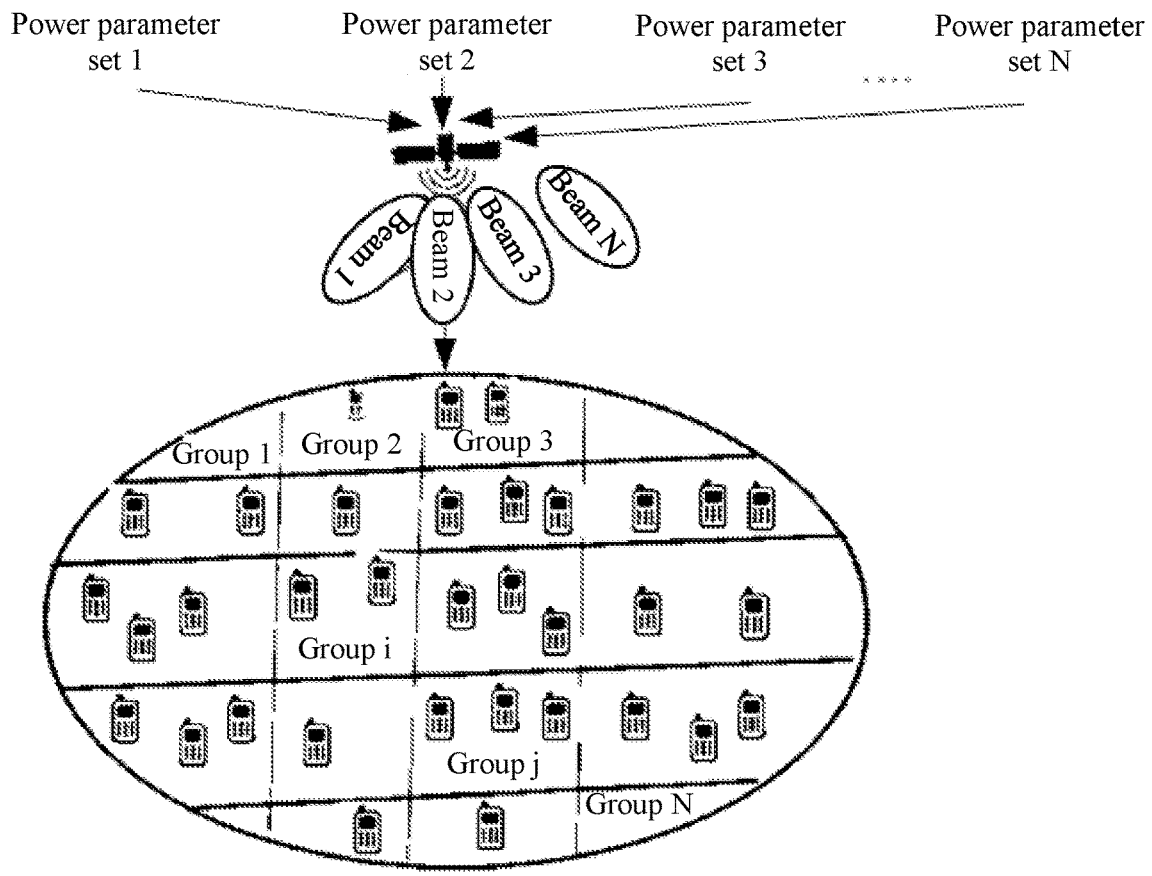
FIG. 6 is a schematic diagram of power control for multi-beam switching of a GEO satellite provided by an embodiment.

FIG. 6 is a schematic diagram of power control for multi-beam switching of a GEO satellite provided by an embodiment. As shown in FIG. 6, using beam switching during GEO satellite movement as an example, a beam coverage area is always fixed, and a power control process includes the following steps.

The service node pre-configures different power parameter sets (power parameter set 1, power parameter set 2, . . . , power parameter set N), and the different power parameter sets correspond to different beams.

The service node generates different reference signals for distinguishing between different beams.

The service node divides the beam coverage area into a plurality of regions, and transmits region identifiers to terminal devices in the corresponding regions through the second group indication information.

Before serving beam switching, the service node indicates the power parameter set to the terminal device through configuration information.

The terminal device receives the configuration information according to the group to which the terminal device belongs, and calculates the transmit power utilizing a power parameter set corresponding to a region to which the terminal device belongs, to realize power control of all groups under the serving beam switching.

In the above embodiment, by pre-configuring and indicating the power parameter set under beam movement and beam switching, the service node can realize an indication and control of the transmit power of the terminal device, improve flexibility of the power control, and ensure communication quality. The service node generates different reference signals or broadcasts different carriers to distinguish between beams, so as to accurately indicate the corresponding power parameter set. According to the satellite ephemeris and moving trajectories of the reference points, the service node broadcasts the group reference points or indicates region identifiers, to group the terminal devices, and then performs indication and power control according to the groups, thereby saving signaling overheads and improving efficiency of indication and power control.

In an embodiment of the present disclosure, there is also provided a power control method, which is applied to a terminal device, for example, User Equipment (UE). It should be noted that, in this embodiment, operations performed by the terminal device correspond one-to-one to the operations performed by the service node in the above embodiments, and reference may be made to any of the above embodiments for technical details not described in this embodiment.

Figure 7:
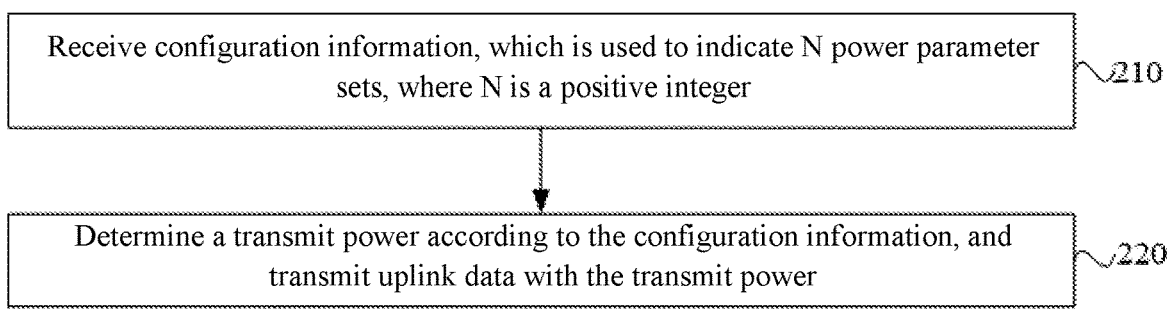
FIG. 7 is a flowchart of a power control method provided by another embodiment.

FIG. 7 is a flowchart of a power control method provided by another embodiment. As shown in FIG. 7, the method provided in this embodiment includes steps 210 and 220.

At step 210, configuration information is received, which is utilized to indicate N power parameter sets, where N is a positive integer.

At step 220, a transmit power is determined according to the configuration information, and uplink data is transmitted with the transmit power.

In this embodiment, the service node pre-configures N power parameter sets, and indicates the sets to the terminal device through the configuration information. The N power parameter sets provide a reliable basis for selection and application of the terminal devices in cases of different beams, different reference signals or different carriers. According to an indication of the configuration information, the terminal device utilizes a corresponding power parameter set to calculate the transmit power, which can adapt to beam movement or switching and realize flexible control of power.

In an embodiment, the N power parameter sets are associated with L beams, where L is a positive integer.

In an embodiment, each beam is represented by one of: one reference signal; one carrier; or one spatial domain transmission resource; where the spatial domain transmission resource includes one of: an antenna port; a codebook; or a transport layer.

In an embodiment, the configuration information is received through one of the following signaling: a broadcast message; RRC signaling; MAC CE signaling; or DCI.

In an embodiment, the power parameter set includes at least one of: a power nominal value; a partial power compensation factor; a downlink reference signal for path loss measurement; a downlink reference signal transmit power; or a power offset.

In an embodiment, the method further includes a step S230 or a step S240.

At step S230, power update indication information is received and the transmit power is adjusted according to the power update indication information.

At step S240, the transmit power is adjusted based on a power parameter set associated with a serving beam after switching according to serving beam switching information.

In this embodiment, the serving beam is a beam for data transmission between the service node and the terminal device, and serving beam switching means that a serving beam, in the L beams, utilized for data transmission is switched to another serving beam. In case of receiving the power update indication information, the terminal device can update the transmit power by adjusting parameters in the power parameter set (for example, a power compensation factor $\alpha$ is adjusted from 0.7 to 1). Alternatively, in the case of serving beam switching, the terminal device can recalculate the transmit power utilizing a power parameter set associated with the serving beam after switching, to realize real-time update and adjustment of the transmit power, improve flexibility and reliability of power control, and ensure data transmission quality.

In an embodiment, the method further includes a step S211.

At step S211, correlations between the N power parameter sets and the L beams are determined according to the configuration information.

In an embodiment, the method further includes steps S250 and S251.

At step S250, first group indication information is received, where the first group indication information includes information of group reference points, and each group reference point corresponds to one group.

At step S251, a group to which the terminal device belongs is determined according to the first group indication information.

In this embodiment, the terminal device can determine the group to which the terminal device belongs according to the first group indication information, and determine, according to an indication of the configuration information, which power parameter set should be utilized by the group to which the terminal device belongs. For example, the terminal device can determine the nearest group reference point according to the first group indication information, and utilize a group corresponding to the group reference point as a group to which the terminal device belongs. Then, the terminal device can determine a power parameter set to be utilized from the configuration information according to the group, and the service node does not need to indicate a power parameter set to each terminal device, thereby effectively reducing signaling overheads and improving efficiency of indication and power control.

In an embodiment, the method further includes steps S260 and S261.

At step S260, second group indication information is received, where the second group indication information includes a region identifier, and each region corresponds to one group.

At step S261, a group to which the terminal device belongs is determined according to the second group indication information.

In this embodiment, the terminal device can determine the group to which the terminal device belongs according to the second group indication information, and determine, according to an indication of the configuration information, which power parameter set should be utilized by the group to which the terminal device belongs. For example, the terminal device can determine, according to the second group indication information, a region at which the terminal device is located, and utilize a group corresponding to the region as a group to which the terminal device belongs. Then, the terminal device can determine a power parameter set to be utilized from the configuration information according to the group, and the service node does not need to indicate a power parameter set to each terminal device, thereby effectively reducing signaling overheads and improving efficiency of indication and power control.

In an embodiment, the method further includes a step S270.

At step S270, a power parameter set, in the configuration information, associated with the group to which the terminal device belongs is determined according to the group to which the terminal device belongs.

Figure 8:
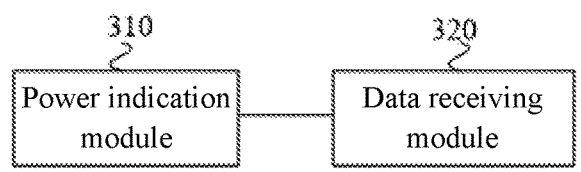
FIG. 8 is a schematic diagram of a power control apparatus provided by an embodiment.

An embodiment of the present disclosure provides a power control apparatus. FIG. 8 is a schematic diagram of a power control apparatus provided by an embodiment. As shown in FIG. 8, the power control apparatus includes: a power indication module 310 and a data receiving module 320.

The power indication module 310 is configured to transmit configuration information, which is utilized to indicate N power parameter sets, where N is a positive integer.

The data receiving module 320 is configured to receive uplink data, where a transmit power of the uplink data is determined by a terminal device according to the configuration information.

The power control apparatus in this embodiment indicates the pre-configured power parameter set to the terminal device through the configuration information, providing a basis for the terminal device to calculate the transmit power. In this way, the service node realizes flexible indication and control of the transmit power of the terminal device, and improves reliability of power control.

In an embodiment, the N power parameter sets are associated with L beams, where L is a positive integer.

In an embodiment, each beam is represented by one of: one reference signal; one carrier; or one spatial domain transmission resource. The spatial domain transmission resource includes one of: different antenna ports, different codebooks, or different transport layers.

In an embodiment, the configuration information is transmitted through one of the following signaling: a broadcast message; RRC signaling; MAC CE signaling; or DCI.

In an embodiment, the power parameter set includes at least one of: a power nominal value; a partial power compensation factor; a downlink reference signal for path loss measurement; a downlink reference signal transmit power; or a power offset.

In an embodiment, the apparatus further includes a first updating module or a second updating module.

The first updating module is configured to transmit power update indication information to the terminal device according to serving beam switching information.

The second updating module is configured to transmit power update indication information to the terminal device according to an uplink measurement result.

In an embodiment, the configuration information is also utilized to indicate correlations between the N power parameter sets and the L beams.

In an embodiment, the apparatus further includes: a first group indication module configured to transmit first group indication information, where the first group indication information includes information of group reference points, and each group reference point corresponds to one group.

In an embodiment, the apparatus further includes: a second group indication module configured to transmit second group indication information, where the second group indication information includes a region identifier, and each region corresponds to one group.

In an embodiment, the power indication module is configured to: transmit, to each of the groups, a respective power parameter set associated with the respective terminal device group.

The power control apparatus provided by this embodiment and the power control method applied to a service node provided by the above embodiment belong to the same inventive concept. Reference may be made to any of the above embodiments for technical details not described in this embodiment, and this embodiment has the same beneficial effect as that can be obtained by performing the power control method applied to a service node.

Figure 9:
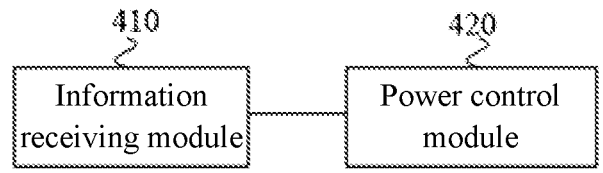
FIG. 9 is a schematic diagram of a power control apparatus provided by another embodiment.

An embodiment of the present disclosure provides a power control apparatus. FIG. 9 is a schematic diagram of a power control apparatus provided by another embodiment. As shown in FIG. 9, the power control apparatus includes: an information receiving module 410 and a power control module 420.

The information receiving module 410 is configured to receive configuration information, which is utilized to indicate N power parameter sets, where N is a positive integer.

The power control module 420 is configured to determine a transmit power according to the configuration information, and transmit uplink data with the transmit power.

According to an indication of the configuration information, the power control apparatus in this embodiment utilizes an appropriate power parameter set to calculate the transmit power, which can adapt to beam movement or switching and realize flexible control of power.

In an embodiment, the N power parameter sets are associated with L beams, where L is a positive integer.

In an embodiment, each beam is represented by one of: one reference signal; one carrier; or one spatial domain transmission resource. The spatial domain transmission resource includes one of: different antenna ports, different codebooks, or different transport layers.

In an embodiment, the configuration information is received through one of the following signaling: a broadcast message; RRC signaling; MAC CE signaling; or DCI.

In an embodiment, the power parameter set includes at least one of: a power nominal value; a partial power compensation factor; a downlink reference signal for path loss measurement; a downlink reference signal transmit power; or a power offset.

In an embodiment, the apparatus further includes a first adjustment module or a second adjustment module.

The first adjustment module is configured to receive power update indication information and adjust the transmit power according to the power update indication information.

The second adjustment module is configured to adjust the transmit power based on a power parameter set associated with a serving beam after switching according to serving beam switching information.

In an embodiment, the apparatus further includes a correlation determining module configured to determine correlations between the N power parameter sets and the L beams according to the configuration information.

In an embodiment, the apparatus further includes a first group determining module configured to receive first group indication information, where the first group indication information includes information of group reference points, and each group reference point corresponds to one group;

and determine a group to which the terminal device belongs according to the first group indication information.

In an embodiment, the apparatus further includes a second group determining module configured to receive second group indication information, where the second group indication information includes a region identifier, and each region corresponds to one group; and determine a group to which the terminal device belongs according to the second group indication information.

In an embodiment, the apparatus further includes a parameter set determining module configured to transmit, to each of the groups, a respective power parameter set associated with the respective terminal device group.

The power control apparatus provided by this embodiment and the power control method applied to a terminal device provided by the above embodiment belong to the same inventive concept. Reference may be made to any of the above embodiments for technical details not described in this embodiment, and this embodiment has the same beneficial effect as that can be obtained by performing the power control method applied to a terminal device.

An embodiment of the present disclosure provides a service node. the power control method is performed by a power control apparatus, which can be implemented by software and/or hardware and integrated in the service node. The service node is, for example, a base station.

Figure 10:
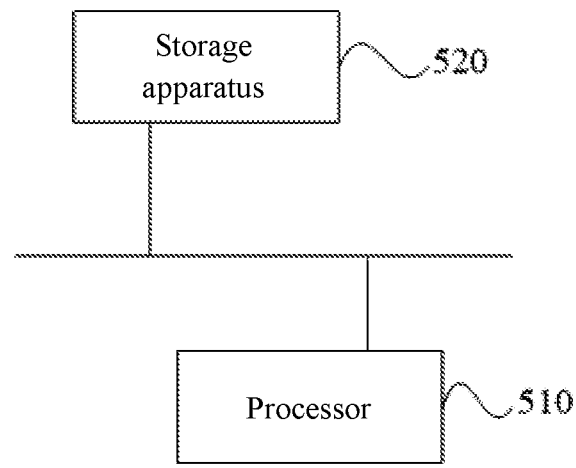
FIG. 10 is a schematic diagram of a hardware structure of a service node provided by an embodiment.

FIG. 10 is a schematic diagram of a hardware structure of a service node provided by an embodiment. As shown in FIG. 10, this embodiment provides a service node, including: a processor 510 and a storage apparatus 520. There is one or more processors in the service node. In FIG. 10, one processor 510 is shown as an example. The processor 510 and the storage apparatus 520 in the device can be connected by a bus or by other means. In FIG. 10, the connection is realized by a bus as an example.

The at least one program, when executed by the at least one processor 510, causes the at least one processor to perform the power control method applied to a service node according to any one of the above embodiments.

The storage apparatus 520 in the service node, as a computer-readable storage medium, can be utilized to store at least one program, which may be a software program, a computer-executable program, or modules, such as program instructions/modules (for example, the modules in the power control apparatus shown in FIG. 8, including the power indication module 310 and the data receiving module 320) corresponding to the power control method applied to a service node in the embodiments of the present disclosure. The processor 510 executes various functional applications and data processing of the service node, that is, performs the power control method applied to a service node in the foregoing method embodiments, by running the software program, instructions and modules stored in the storage apparatus 520.

The storage apparatus 520 mainly includes a program storage area and a data storage area, where the program storage area can store an operating system and application program(s) required by at least one function, and the data storage area can store data or the like (for example, configuration information or power parameter sets in the above embodiments) created according to utilize of a device. In addition, the storage apparatus 520 may include a high-speed random access memory and a non-volatile memory, for example, at least one magnetic disk storage device, a flash memory device, or another non-volatile solid-state storage device. In some examples, the storage apparatus 520 may further include memories remotely located with respect to the processor 510, and these remote memories may be connected to the service node via a network. Examples of the above-mentioned network, include but are not limited to, the Internet, an intranet, a local area network, a mobile communication network, and a combination thereof.

In addition, the at least one program included in the service node, when executed by the at least one processor 510, causes the following operations to be performed: transmitting configuration information, which is utilized to indicate N power parameter sets, where N is a positive integer; and receiving uplink data, where a transmit power of the uplink data is determined by a terminal device according to the configuration information.

The service node provided by this embodiment and the power control method applied to a service node provided by the above embodiment belong to the same inventive concept. Reference may be made to any of the above embodiments for technical details not described in this embodiment, and this embodiment has the same beneficial effect as that can be obtained by performing the power control method applied to a service node.

An embodiment of the present disclosure provides a terminal device. the power control method is performed by a power control apparatus, which can be implemented by software and/or hardware and integrated in the terminal device. The terminal device is, for example, a base station.

Figure 11:
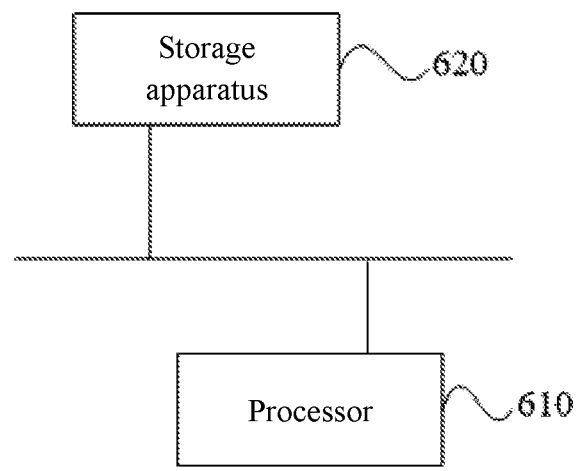
FIG. 11 is a schematic diagram of a hardware structure of a terminal device provided by an embodiment.

FIG. 11 is a schematic diagram of a hardware structure of a terminal device provided by an embodiment. As shown in FIG. 11, this embodiment provides a terminal device, including: a processor 610 and a storage apparatus 620. There is one or more processors in the terminal device. In FIG. 11, one processor 610 is shown as an example. The processor 610 and the storage apparatus 620 in the device can be connected by a bus or by other means. In FIG. 11, the connection is realized by a bus as an example.

The at least one program, when executed by the at least one processor 610, causes the at least one processor to perform the power control method applied to a terminal device according to any one of the above embodiments.

The storage apparatus 620 in the terminal device, as a computer-readable storage medium, can be utilized to store at least one program, which may be a software program, a computer-executable program, or modules, such as program instructions/modules (for example, the modules in the power control apparatus shown in FIG. 9, including the information receiving module 410 and the power control module 420) corresponding to the power control method applied to a terminal device in the embodiments of the present disclosure. The processor 610 executes various functional applications and data processing of the terminal device, that is, performs the power control method applied to a terminal device in the foregoing method embodiments, by running the software program, instructions and modules stored in the storage apparatus 620.

The storage apparatus 620 mainly includes a program storage area and a data storage area, where the program storage area can store an operating system and application program(s) required by at least one function, and the data storage area can store data or the like (for example, configuration information or power parameter sets in the above embodiments) created according to use of a device. In addition, the storage apparatus 620 may include a high-speed random access memory and a non-volatile memory, for example, at least one magnetic disk storage device, a flash memory device, or another non-volatile solid-state storage device. In some examples, the storage apparatus 620 may further include memories remotely located with respect to the processor 610, and these remote memories may be connected to the terminal device via a network. Examples of the above-mentioned network, include but not limited to, the Internet, an intranet, a local area network, a mobile communication network, and a combination thereof.

In addition, the at least one program included in the terminal device, when executed by the at least one processor 610, causes the following operations to be performed: receiving configuration information, which is utilized to indicate N power parameter sets, where N is a positive integer; and determining a transmit power according to the configuration information, and transmitting uplink data with the transmit power.

The terminal device provided by this embodiment and the power control method applied to a terminal device provided by the above embodiment belong to the same inventive concept. Reference may be made to any of the above embodiments for technical details not described in this embodiment, and this embodiment has the same beneficial effect as that can be obtained by performing the power control method applied to a terminal device.

An embodiment of the present disclosure provides a storage medium including computer-executable instructions which, when executed by a computer processor, causes to computer processor to perform a power control method applied to a service node or a power control method applied to a terminal device.

Here, the power control method applied to a service node includes: transmitting configuration information, which is utilized to indicate N power parameter sets, where N is a positive integer; and receiving uplink data, where a transmit power of the uplink data is determined by a terminal device according to the configuration information.

Here, the power control method applied to a terminal device includes: receiving configuration information, which is utilized to indicate N power parameter sets, where N is a positive integer; and determining a transmit power according to the configuration information, and transmitting uplink data with the transmit power.

Through the description of the above embodiments, those of ordinary skill in the art can understand that the present disclosure can be implemented by means of software and general-purpose hardware, or can be implemented by hardware. Based on this understanding, the technical schemes of the present disclosure can be embodied in the form of software products, which can be stored in a computer-readable storage medium (such as a floppy disk, Read-Only Memory (ROM), Random Access Memory (RAM), flash, hard disk and optical disk of a computer) and include instructions to cause a computer device (such as a personal computer, a server, or a network device) to perform the methods of the embodiments of the present disclosure.

The above-described embodiments are only example embodiments of the present disclosure, and are not intended to limit the scope of protection of the present disclosure.

The block diagram of any logic process in the drawings of the present disclosure may represent program steps, or may represent interconnected logic circuits, modules and functions, or may represent a combination of program steps and logic circuits, modules and functions. The computer program can be stored in a memory. The memory may be of any type that is suitable for a local technical environment and can be implemented by utilizing any suitable data storage technology, for example but not limited to, a ROM, a RAM, optical storage devices and systems (a Digital Versatile Disk (DVD) or a Compact Disk (CD)). The computer-readable medium may include a non-transitory storage medium. The data processor may be any type suitable for the local technical environment, for example but not limited to, a general-purpose computer, a special-purpose computer, a microprocessor, a Digital Signal Processor (DSP), an Application-Specific Integrated Circuit (ASIC), a Field-Programmable Gate Array (FPGA) and a processor based on a multi-core processor architecture.

What is claimed is:

1. A power control method, which is applied to a service node, the method comprising:
   transmitting configuration information, which is utilized to indicate N power parameter sets, wherein N is a positive integer;
   receiving uplink data, wherein a transmit power of the uplink data is determined by a terminal device according to the configuration information; and
   transmitting first group indication information according to the satellite ephemeris and moving trajectories of group reference points, wherein the first group indication information comprises information of group reference points, and each group reference point corresponds to a terminal device group.

2. The method of claim 1, wherein the N power parameter sets are associated with L beams, wherein L is a positive integer.

3. The method of claim 2, wherein each beam is represented by one of: one reference signal; one carrier; or one spatial domain transmission resource,
   wherein the spatial domain transmission resource comprises one of:
   an antenna port;
   a codebook; or
   a transport layer.

4. The method of claim 2, further comprising:
   transmitting power update indication information to the terminal device according to serving beam switching information; or
   transmitting power update indication information to the terminal device according to an uplink measurement result.

5. The method of claim 2, wherein the configuration information is utilized to indicate correlations between the N power parameter sets and the L beams.

6. The method of claim 1, wherein the configuration information is transmitted through one of the following signaling:
   a broadcast message;
   Radio Resource Controlling (RRC) signaling;
   Medium Access Control Control Element (MAC CE) signaling; or
   Downlink Control Information (DCI).

7. The method of claim 1, wherein each power parameter set comprises at least one of:
   a power nominal value;
   a partial power compensation factor;
   a downlink reference signal for path loss measurement;
   a downlink reference signal transmit power; or
   a power offset.

8. The method of claim 1, further comprising:
   transmitting, to each respective one of a plurality of the terminal device groups, a respective power parameter set associated with the respective terminal device group.

9. The method of claim 1, further comprising:
   transmitting second group indication information, wherein the second group indication information comprises a region identifier, and a respective region corresponds to a respective terminal device group;

transmitting, to each respective one of a plurality of the terminal device groups, a respective power parameter set associated with the respective terminal device group.

10. A service node, comprising:

at least one processor; and a storage apparatus configured to store at least one program, wherein the at least one program, when executed by the at least one processor, causes the at least one processor to perform the power control method of claim 1.

11. A non-transitory computer-readable storage medium storing a computer program which, when executed by a processor, causes the processor to perform the power control method of claim 1.

12. A power control method, which is applied to a terminal device, the method comprising:

receiving configuration information, which is utilized to indicate N power parameter sets, wherein N is a positive integer;

determining a transmit power according to the configuration information, and transmitting uplink data with the transmit power; and receiving first group indication information based on the satellite ephemeris and moving trajectories of group reference points, wherein the first group indication information comprises information of group reference points, and each group reference point corresponds to a terminal device group; and determining, according to one of the group reference points of the first group indication information, a group to which the terminal device belongs and the group reference point corresponds.

13. The method of claim 12, wherein the N power parameter sets are associated with L beams, wherein L is a positive integer.

14. The method of claim 13, further comprising:

receiving power update indication information, and adjusting the transmit power according to the power update indication information; or adjusting the transmit power based on a power parameter set associated with a serving beam after switching, according to serving beam switching information.

15. The method of claim 12, wherein each power parameter set comprises at least one of:

a power nominal value;

a partial power compensation factor;

a downlink reference signal for path loss measurement;

a downlink reference signal transmit power; or a power offset.

16. The method of claim 12, further comprising:

determining, according to the configuration information, correlations between the N power parameter sets and the L beams.

17. The method of claim 12, further comprising:

determining, according to the group to which the terminal device belongs, a power parameter set, in the configuration information, associated with the group to which the terminal device belongs.

18. The method of claim 12, further comprising:

receiving second group indication information, wherein the second group indication information comprises a region identifier, and a respective region corresponds to a respective terminal device group;

determining, according to the second group indication information, a group to which the terminal device belongs; and determining, according to the group to which the terminal device belongs, a power parameter set, in the configuration information, associated with the group to which the terminal device belongs.

19. A terminal device, comprising:

at least one processor; and a storage apparatus configured to store at least one program, wherein the at least one program, when executed by the at least one processor, causes the at least one processor to perform the power control method of claim 12.

20. A non-transitory computer-readable storage medium storing a computer program which, when executed by a processor, causes the processor to perform the power control method of claim 12.

* * * * *